United States Patent
Dickenson et al.

(10) Patent No.: US 7,451,357 B2
(45) Date of Patent: Nov. 11, 2008

(54) APPARATUS AND SYSTEM FOR ADJUSTING TRACE DATA GRANULARITY

(75) Inventors: Gary I. Dickenson, Tucson, AZ (US); Thomas Charles Jarvis, Tucson, AZ (US); Paul Matthew Richards, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/992,528

(22) Filed: Nov. 18, 2004

(65) Prior Publication Data

US 2006/0112312 A1 May 25, 2006

(51) Int. Cl.
G06F 11/00 (2006.01)
(52) U.S. Cl. ....................................... 714/45
(58) Field of Classification Search ..................... 714/45
See application file for complete search history.

(56) References Cited

U.S. PATENT DOCUMENTS

| | | | |
|---|---|---|---|
| 5,444,583 A | 8/1995 | Ehrlich et al. | 360/78.09 |
| 5,774,724 A * | 6/1998 | Heisch | 717/129 |
| 5,793,947 A * | 8/1998 | Sakamoto | 714/45 |
| 5,978,902 A | 11/1999 | Mann | 712/227 |
| 6,134,676 A | 10/2000 | VanHuben et al. | 714/39 |
| 6,148,437 A | 11/2000 | Shah et al. | 717/4 |
| 6,233,678 B1 * | 5/2001 | Bala | 712/240 |
| 6,279,103 B1 | 8/2001 | Warren | 712/227 |
| 6,336,191 B1 | 1/2002 | Smolders et al. | 713/501 |
| 6,662,347 B2 | 12/2003 | Wong | 716/4 |
| 6,728,949 B1 * | 4/2004 | Bryant et al. | 717/127 |
| 6,813,731 B2 * | 11/2004 | Zahavi et al. | 714/45 |
| 7,260,692 B1 * | 8/2007 | Zahavi et al. | 711/154 |
| 2002/0174416 A1 | 11/2002 | Bates et al. | 717/128 |
| 2002/0198983 A1 * | 12/2002 | Ullmann et al. | 709/224 |
| 2003/0088854 A1 | 5/2003 | Wygodny et al. | 717/130 |
| 2004/0078691 A1 * | 4/2004 | Cirne et al. | 714/38 |
| 2004/0133388 A1 | 7/2004 | Swoboda | 702/177 |
| 2004/0153287 A1 * | 8/2004 | Kirshenbaum et al. | 702/187 |
| 2004/0153863 A1 * | 8/2004 | Klotz et al. | 714/45 |
| 2004/0268314 A1 | 12/2004 | Kollman et al. | 717/128 |
| 2005/0060598 A1 * | 3/2005 | Klotz et al. | 714/4 |
| 2005/0278706 A1 | 12/2005 | Garza et al. | 717/128 |

FOREIGN PATENT DOCUMENTS

EP 0897151 2/1999

\* cited by examiner

*Primary Examiner*—Joshua A Lohn
(74) *Attorney, Agent, or Firm*—Kunzler & McKenzie

(57) ABSTRACT

An apparatus and system are disclosed for adjusting trace data granularity. An initialization module sets a base granularity for trace data recorded for a component. A registration module registers a condition counter comprising a condition set. The threshold module sets a count threshold for the condition counter. An increment module counts each instance of the condition set. An adjustment module adjusts the granularity of trace data stored for the component to a modified granularity if the condition count exceeds the count threshold. In one embodiment, a timer module times an adjusted trace data granularity time interval. The adjustment module may set the granularity of the trace data to the base granularity when the adjusted trace data granularity time interval exceeds a specified time interval.

24 Claims, 9 Drawing Sheets

900

| | Identifier | System Counter Identifier | Counter Increment Value | Next Increment Value | Instance Counter |
|---|---|---|---|---|---|
| 950a | Identifier 905a | System Counter Identifier 910a | Counter Increment Value 915a | Next Increment Value 920a | Instance Counter 925a |
| 950b | Identifier 905b | System Counter Identifier 910b | Counter Increment Value 915b | Next Increment Value 920b | Instance Counter 925b |
| 950c | Identifier 905c | Condition Count 945 | | | |
| 950d | Identifier 905d | Set Increment Value 930 | | | |
| 950e | Identifier 905e | Function Call 935 | | | |
| 950f | Identifier 905f | First Granularity Parameter 940a | Second Granularity Parameter 940b | | |

FIG. 9

APPARATUS AND SYSTEM FOR ADJUSTING TRACE DATA GRANULARITY

BACKGROUND OF THE INVENTION

1. Field of the Invention

This invention relates to trace data granularity and more particularly relates to automatically and dynamically adjusting the granularity of trace data.

2. Description of the Related Art

Data processing systems such as mainframe computers, servers, data storage systems, and the like typically record trace data. Trace data may include error data such as error codes, diagnostic data that is used to track the state of the system such as register values, software instruction values, memory addresses and the like, and records of system events such as inter-component communications, the loading of software, and the like.

The data processing system often includes one or more components. Each component may record trace data specific to the component in local memory. For example, a storage device may record trace data specific to the storage device in the storage device's local memory. In an alternate embodiment, a component records trace data specific to the component in a central memory such as the memory of a control unit.

Trace data is often stored in a buffer with a fixed size. For example, a component such as the storage device may allocate one hundred megabytes (100 MB) for a trace data buffer. The component records the most recent trace data to the buffer. In one embodiment, the component may delete the oldest trace data in the buffer to prevent the trace data from overflowing the buffer. Thus the component retains the most recent trace data. In certain embodiments, the component periodically downloads the trace data from the buffer. For example, the component may save the trace data to magnetic tape, or transmit the trace data to a service center.

During the development of software or the integration of new hardware and software, an administrator may direct the data processing system and the components of the system to record extensive amounts of trace data that provide a highly granular view of the system's operations. The administrator, an integrator, or a developer may use the high granularity trace data to find and correct system problems or to verify that the system is performing as designed. High granularity trace data may rapidly fill a trace data buffer, but may also provide the detailed information required to identify and correct a problem Unfortunately, if a significant event such as a serious error occurs and is recorded as high granularity trace data in the buffer during normal operations, subsequent high granularity trace data may overwrite the event before the administrator could access the trace data in the buffer. Therefore during normal operations, the administrator may direct the data processing system to record trace data with fewer details providing a low granularity view of system operations. Although the low granularity trace data is less useful for identifying and correcting problems, the low granularity of the trace data allows trace data for a longer time interval to be maintained in the trace buffer. In addition, recording low granularity trace data reduces the overhead of recording trace data and the amount of data that must be downloaded such as to magnetic tape.

Unfortunately, significant events may occur during normal operation when the data processing system is recording the low granularity trace data. Yet the administrator or a service engineer may require the high granularity trace data in order to identify and correct problems. High granularity trace data is particularly useful in capturing and identifying infrequent or transient events, and may be highly useful if the high granularity trace data is recorded for specified circumstances.

From the foregoing discussion, it should be apparent that a need exists for an apparatus, system, and method that automatically and dynamically adjust trace data granularity. Beneficially, such an apparatus, system, and method would allow a system to record high granularity trace data under specified conditions while recording lower granularity trace data when high granularity trace data is not needed.

SUMMARY OF THE INVENTION

The present invention has been developed in response to the present state of the art, and in particular, in response to the problems and needs in the art that have not yet been fully solved by currently available methods for recording trace data. Accordingly, the present invention has been developed to provide an apparatus, system, and method for adjusting trace data granularity that overcome many or all of the above-discussed shortcomings in the art.

The apparatus to adjust trace data granularity is provided with a logic unit containing a plurality of modules configured to functionally execute the necessary steps of registering a condition counter, setting a count threshold, counting condition set instances, and adjusting the granularity. These modules in the described embodiments include a condition counter, a registration module, a threshold module, an increment module, and an adjustment module.

A system counter counts system events such as errors, transactions between components, and the like. For example, a first system counter may count each failure of a control unit to access a storage device. A condition set is configured as at least one instance of at least one system counter. For example, the condition set may be specified as ten (10) instances of a component access error count and one (1) instance of a write error count. The condition counter counts each occurrence of the condition set for a component.

The registration module registers the condition counter. In one embodiment, the registration module registers the identity of the component and the condition set of the condition counter. The threshold module sets a count threshold for the condition counter. The count threshold is the maximum number of instances of the condition set that may occur before the apparatus adjusts the trace data granularity. In one embodiment, a configuration file specifies the count threshold. For example, the configuration file may direct the threshold module to set the count threshold at five (5) instances.

The increment module counts each instance of the condition set. Thus, in the example above, if the component access error system counter counted ten (10) instances of the component access error and one (1) instance of the write error, the increment module increments the condition counter.

The adjustment module adjusts the granularity of trace data recorded for the component to a modified granularity if the condition count exceeds the count threshold. In one embodiment, the adjustment module increases the trace data granularity from a low granularity to a specified high granularity. In an alternate embodiment, the adjustment module decreases the trace data granularity to a specified low granularity.

In the example above, if the increment module increments the condition counter six (6) times in response to the occurrence of six (6) instances of the condition set, the adjustment module may adjust the trace data granularity from a low granularity to a high granularity. The apparatus adjusts the trace data granularity automatically and dynamically to provide additional information, such as for diagnosing data processing system errors and anomalies.

A system of the present invention is also presented to adjust trace data granularity. The system may be embodied in a data processing system. In particular, the system, in one embodiment, comprises a data storage system. The system includes a control unit comprising an error module and a first component comprising an adjustment module and a trace data module. In addition, the error module includes a condition counter, a registration module, a threshold module, and an increment module. The error module may further include a communication module, a management module, an input module, an initialization module, and a timer module.

The control unit communicates with the first component. In addition, the control unit and the first component singly and in cooperation perform a data processing function. In one embodiment, the control unit is a storage controller. The first component may be a data cache, a storage device, host interface, or the like. In one embodiment, the control unit communicates with a plurality of components.

The error module maintains a plurality of system counters configured to count system events. The system counters count system events involving the control unit, the first component, and transactions between the first component and the control unit. In one embodiment, the system counters count events involving one or more of a plurality of components.

The trace data module records trace data for the first component. In one embodiment, the initialization module sets a base granularity for trace data recorded for the first component. The registration module registers the condition counter. The condition counter counts each occurrence of a condition set. The threshold module sets a count threshold for the condition counter. The increment module counts each instance of the condition set. The adjustment module adjusts the granularity of trace data recorded for the first component to a modified granularity if the condition count exceeds the count threshold.

In one embodiment, the management module directs the adjustment module to adjust the granularity of the trace data to the modified granularity. In a certain embodiment, the input module receives an administrator command and the management module directs the adjustment module to adjust the granularity of the trace data responsive to the administrator command. The management module may also direct the adjustment module to adjust the con granularity of trace data of a second component if the condition count of the first component exceeds the count threshold. The system adjusts the trace data granularity recorded by a component in response to one or more system events or an administrator command.

A method of the present invention is also presented for adjusting trace data granularity. The method in the disclosed embodiments substantially includes the steps necessary to carry out the functions presented above with respect to the operation of the described apparatus and system. In one embodiment, the method includes registering a condition counter, setting a count threshold, counting condition set instances, and adjusting the trace data granularity. The method also may include specifying a time interval, timing an adjusted trace data granularity time interval, and setting the granularity of the trace data to the base granularity when the adjusted trace data granularity time interval exceeds a specified time interval.

In one embodiment, an initialization module sets a base granularity for trace data recorded for a component. A registration module registers a condition counter comprising a condition set. The threshold module sets a count threshold for the condition counter. An increment module counts each instance of the condition set. An adjustment module adjusts the granularity of trace data stored for the component to a modified granularity if the condition count exceeds the count threshold. In one embodiment, a timer module times an adjusted trace data granularity time interval. The adjustment module may set the granularity of the trace data to the base granularity when the adjusted trace data granularity time interval exceeds a specified time interval.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention automatically and dynamically adjusts trace data granularity, allowing a system to record high granularity trace data under specified conditions while recording lower granularity trace data when high granularity trace data is not needed. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 is a schematic block diagram illustrating one embodiment of a condition set array of the present invention.

DETAILED DESCRIPTION OF THE INVENTION

Figure 1:
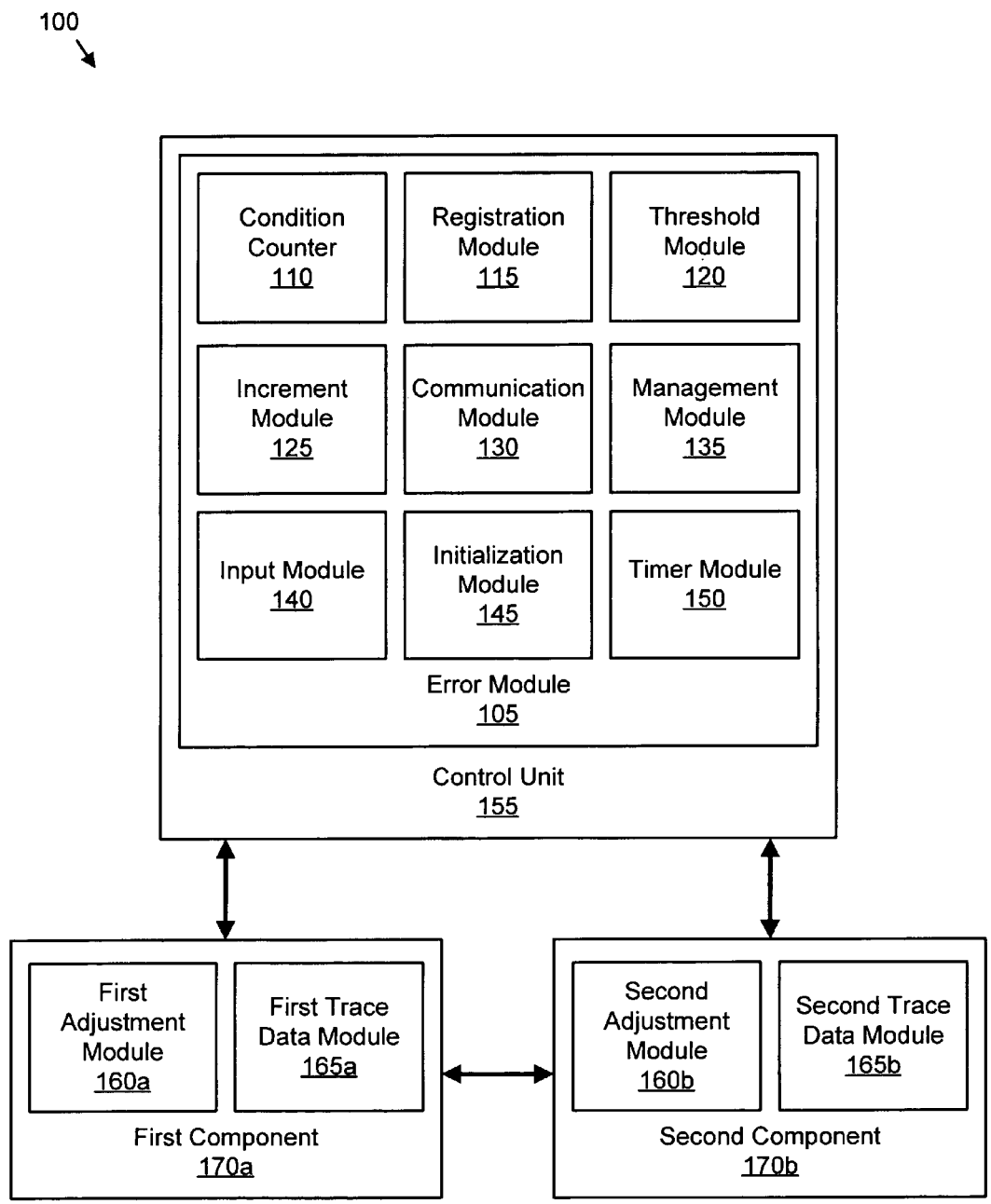
FIG. 1 is a schematic block diagram illustrating one embodiment of a granularity adjustment system in accordance with the present invention.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a granularity adjustment system 100 in accordance with the present invention. The system 100 includes a control unit 155 comprising an error module 105 and one or more components 170 each comprising an adjustment module 160 and a trace data module 165. In addition, the error module 105 includes a condition counter 110, a registration module 115, a threshold module 120, an increment module 125, a communication module 130, a management module 135, an input module 140, an initialization module 145, and a timer module 150.

The control unit 155 communicates with each component 170. In addition, the control unit 155 and the components 170 singly and in cooperation perform a data processing function. In one embodiment, the control unit 155 is a storage controller. The component 170 may be a data cache, a storage device, a host, or the like. Although the system 100 is depicted with one control unit 155 and two components 170, any number of control units 155 and components 170 may be employed.

The error module 105 maintains a plurality of system counters configured to count system events. The system events may involve control unit 155 operations. In addition, the system counters may count events involving transactions between the components 170 and events between the control unit 155 and the components 170. For example, a first system counter may count instances of a write error to the first component 170a wherein the first component is configured as a storage device.

Each trace data module 160 records trace data for a component 170. Trace data may include error data such as error codes, diagnostic data including register values, software instruction values, memory addresses and the like, and records of system events such as inter-component transactions. The trace data may be recorded with varying granularity. For example, high granularity trace data may comprise detailed information on the system 100 state including register values for one or more processors of each device such as the control unit 155 or the components 170, software instructions, communications between devices, and the like. In addition, the high granularity trace data may comprise frequent samples of the system 100 state.

In contrast, low granularity trace data may comprise less detailed information and may be captured less frequently. For example, low granularity trace data may comprise system 100 error messages. Low granularity trace data may be less useful than high granularity trace data for diagnostic purposes. Yet low granularity trace data requires less system 100 overhead to record. In addition, low granularity trace data may be recorded in a trace data buffer that covers a significantly longer time interval than the time interval covered by high granularity trace data recorded in the same buffer. Thus, it is less likely that subsequent trace data will push event information from the trace data buffer when the trace data module 160 is recording low granularity trace data than when the trace data module 160 is recording high granularity trace data.

In one embodiment, the high granularity trace data may include more status information than the low granularity trace data without including any or all of the low granularity trace data status information. For example, the high granularity trace data status information may make the low granularity trace data status information redundant without replicating the low granularity trace data status information. In addition, the low granularity trace data status information may be inferred from the richer status information of the high granularity trace data.

In the past, data processing systems have been limited to recording low granularity trace data or high granularity trace data. Low granularity trace data was typically used during normal operations while high granularity trace data was used to find and correct problems. Unfortunately, the low granularity trace data often did not provide sufficient information to identify and correct problems occurring during normal operation. The present invention automatically and dynamically adjusts trace data granularity, allowing the system 100 to record high granularity trace data under specified conditions while recording lower granularity trace data when high granularity trace data is not needed.

In one embodiment, the initialization module 145 sets a base granularity for trace data recorded for each component 170. The base granularity may be the granularity desired for normal operations. For example, the initialization module 145 may set the base granularity to low granularity for normal operations of the first and second component 170a, 170b.

The registration module 115 registers the condition counter 110 for a specified component 170 such as the first component 170a or the second component 170b. The condition counter 110 comprises a condition set and counts each occurrence of the condition set. The condition set is configured as at least one instance of at least one system counter. In one embodiment, the registration module 115 sets the condition counter 110 to an initial value. For example, registration module 115 may register the condition set as comprising a read error system counter and a write error system counter. In addition, registration module 115 may register the condition set as three (3) instances of the read error and one (1) instance of the write error. Thus, one instance of the condition set comprises three (3) instances of the read error and one (1) instance of the write error. The registration module 115 may further set the condition counter 110 to zero (0). The condition counter 110 counts each occurrence of the condition set.

The threshold module 120 sets a count threshold for the condition counter 110. The increment module 125 counts each instance of the condition set. The adjustment module 160 of the specified component 170 adjusts the granularity of trace data recorded for the specified component 170 to a modified granularity if the condition count exceeds the count threshold. For example, if the registration module 115 registered the condition counter 110 for the first component 170a, the first adjustment module 160a adjusts the granularity of trace data recorded by the first trace data module 165a.

In one embodiment, the management module 135 directs the adjustment module 160 to adjust the granularity of the trace data to the modified granularity. In a certain embodiment, the input module 140 receives an administrator command and the management module 135 directs the adjustment module 160 to adjust the granularity of the trace data in response to the administrator command. The input module 140 may comprise a computer workstation in communication with the control unit 155. The management module 135 may also direct the second adjustment module 160b to adjust the granularity of trace data of the second component 170b if the condition count of the condition counter 110 registered to the first component 170a exceeds the count threshold. The system 100 adjusts the trace data granularity recorded by a component 170 in response to one or more system events or an administrator command.

Figure 2:
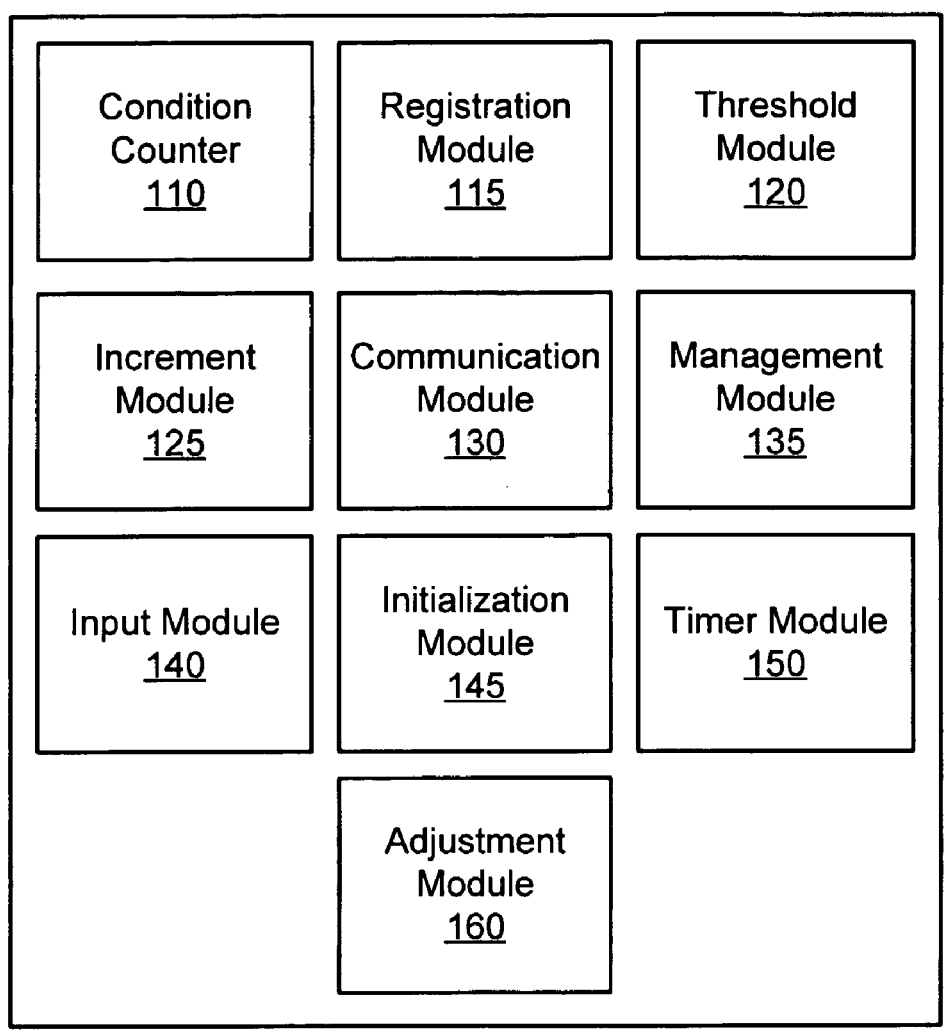
FIG. 2 is a schematic block diagram illustrating one embodiment of a granularity adjustment apparatus of the present invention.

FIG. 2 is a schematic block diagram illustrating one embodiment of a granularity adjustment apparatus 200 of the present invention. A registration module 115 registers a condition counter 110. In one embodiment, the registration includes the identity of a component and a condition set for the condition counter. For example, the registration module 115 may register the condition counter 110 for a first component 170a and further register the condition set as one (1) instance of a first system counter and two (2) instances of a second system counter.

In one embodiment, the registration module 115 creates an array of data fields comprising an identifier for the component 170, an identifier for each system counter, and a counter increment value for each system counter representing the number of instances of the system counter required for one instance of the condition set. In addition, the array may comprise a data field that includes a pointer to a function call configured to direct an adjustment module 160 to adjust the granularity of trace data recorded for the component 170.

The array may also include one or more data fields containing parameters passed to the adjustment module 160 with the function call configured to direct the adjustment of the trace data granularity by the adjustment module 160. For example, a first data word may be configured to specify the granularity of the trace data. In one embodiment, the first data word specifies high granularity. In an alternate embodiment, the first data word specifies low granularity.

The threshold module 120 sets a count threshold for the condition counter 110. The count threshold is the maximum number of instances of the condition set that may occur before the adjustment module 160 adjusts the trace data granularity. In one embodiment, an administrator specifies the count threshold through the input module 140. For example, the administrator may direct the threshold module to set the count threshold at one (1) instance. In an alternate embodiment, the threshold module 120 retrieves the count threshold for the component 170 from a configuration file.

The increment module 125 counts each instance of the condition set. In one embodiment, the increment module 125 polls each system counter listed in the array registered by the registration module 115. The increment module 125 may further store a beginning value and a next increment value for each system counter. The beginning value may be the value of the system counter when first polled by the increment module 125. The next increment value may be the beginning value plus the counter increment value stored in the array.

The increment module 125 may increment the condition counter 110 when each system counter exceeds the system counter's corresponding next increment value. Thus in the example above, if the increment module 125 observes one (1) instance of the first system counter and two (2) instances of the second system counter, the increment module 125 increments the condition counter 110. The increment module 125 may increment the condition counter by a specified increment value such as one (1).

In one embodiment, the communication module 130 communicates the condition count of the condition counter 110 to the adjustment module 160. For example, if the system counters are located in an error module 105 of a control unit 155 in communication with the specified component 170, the communication module 110 may periodically transmit the condition count to the adjustment module 160 of the specified component 170. In an alternate embodiment, the adjustment module 160 requests the condition count from the communication module 130. The communication module 130 may retrieve the condition count from the condition counter 110 and transmit the condition count to the adjustment module 160.

The adjustment module 160 adjusts the granularity of trace data recorded for the specified component to a modified granularity if the condition count exceeds the count thresholds. In one embodiment, the adjustment module 160 increases the trace data granularity from a low granularity to a specified high granularity. In an alternate embodiment, the adjustment module 160 decreases the trace data granularity to a specified low granularity. In the example above, if the increment module 125 increments the condition counter two (2)

times in response to the occurrence of two (2) instances of the condition set, the adjustment module 160 may adjust the trace data granularity from a low granularity to a high granularity.

In one embodiment, the timer module 150 times the adjusted trace data granularity time interval. The adjustment module 160 may set the granularity of the trace data to the base granularity when the adjusted trace data granularity time interval exceeds a specified time interval. For example, the timer module 150 may begin timing when the adjustment module 160 adjusts the trace data granularity from a low granularity to a high granularity. When the time exceeds the specified time interval, such as five seconds (5 s), the adjustment module 160 may set the trace data granularity to the low granularity.

In an alternate embodiment, the timer module 150 times the unadjusted trace data granularity time interval. The adjustment module 160 may adjust the granularity of trace data stored by the specified component to a modified granularity if the condition count does not exceed the count threshold within the specified time interval. For example, the timer module 150 may begin timing while the trace data module 165 records base granularity trace data. If the condition count does not exceed the count threshold within fifteen seconds (15 s), the adjustment module 160 may adjust the trace data granularity to a modified granularity such as a high granularity. The apparatus 200 adjusts the trace data granularity automatically and dynamically to provide additional information such as for diagnosing data processing system errors and anomalies.

Figure 3:
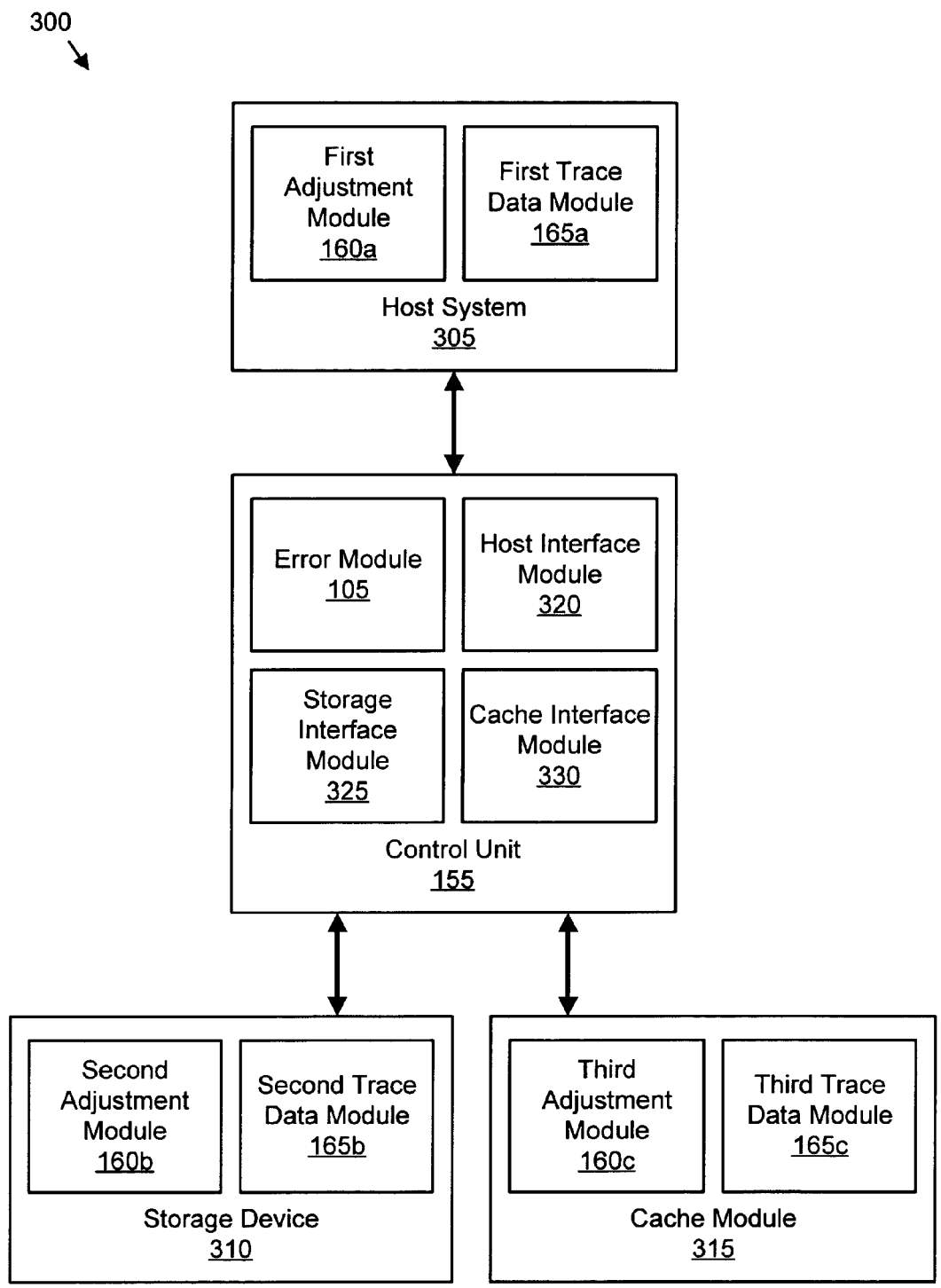
FIG. 3 is a schematic block diagram illustrating one embodiment of a granularity adjusting storage system of the present invention.

FIG. 3 is a schematic block diagram illustrating one embodiment of a granularity adjusting storage system 300 of the present invention. A control unit 155 is in communication with three components, a host system 305, a storage device 310, and a cache module 315. The control unit 155 communicates with the host system 305 through a host interface module 320, the storage device 310 through a storage interface module 325, and the con cache module 315 through a cache interface module 330.

The control unit 155 includes an error module 105. The error module 105 may maintain a plurality of system counters configured to count system events occurring in the control unit 155, host system 305, the host interface module 320, communications between the host system 305 and the host interface module 320, the storage device 310, the storage interface module 325, and communications between storage device 310 and the storage interface module 325, the cache module 315, the cache interface module 330, and communications between the cache module 315 and the cache interface module 330.

In one embodiment, a first component 170a may register a condition counter 110 for a second component 170b wherein if the condition count of the condition counter 110 exceeded a count threshold, a management module 135 is configured to direct the adjustment module 160 of a third component 170c to adjust the recorded trace data granularity for the third component 170c. For example, a registration module 115 may register a condition counter 110 for the host system 305, the condition counter 110 comprising a condition set including one or more storage device 310 system event counters. If the condition count of the condition counter 110 exceeded a count threshold, the management module 135 may direct the adjustment module 160 of the cache module 315 to adjust the trace data granularity recorded by the trace data module 165 of the cache module 315 to a high granularity. The system 300 allows each component 170 such as the host system 305, the storage device 310, and the cache module 315 to adjust the trace data granularity for any component 170 based on the error module 105 system counters of any component 170.

Figure 4:
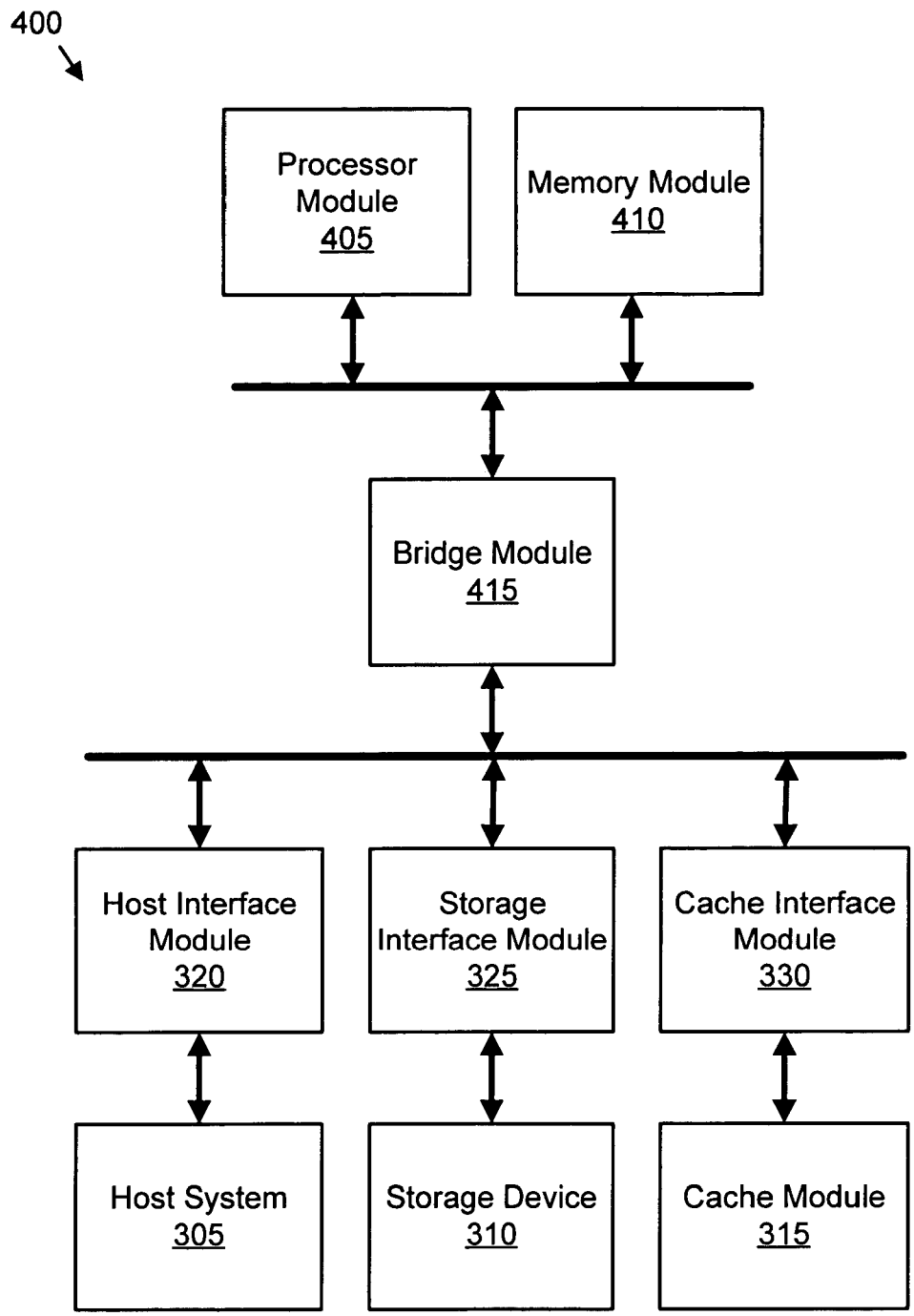
FIG. 4 is a schematic block diagram illustrating one embodiment of a control unit of the present invention.

FIG. 4 is a schematic block diagram illustrating one embodiment of a control unit 400 of the present invention. The control unit 400 includes a processor module 405, a memory module 410, a bridge module 415, a host interface module 320, and a storage interface module 325, and a cache interface module 330.

The processor module 405, memory module 410, bridge module 415, host interface module 320, storage interface module 325, and the cache interface module 330 may be fabricated of semiconductor gates on one or more semiconductor substrates. Each semiconductor substrate may be packaged in one or more semiconductor devices mounted on circuit cards. Connections between the processor module 405, the memory module 410, the bridge module 415, the host interface module 320, the storage interface module 325, and the cache interface module 330 may be through semiconductor metal layers, substrate to substrate wiring, or circuit card traces or wires connecting the semiconductor devices.

The memory module 410 stores software instructions and data. The processor module 405 executes the software instructions and manipulates the data as is well known to those skilled in the art. In addition, the processor module 405 communicates with the host interface module 320, the storage interface module 325, and the cache interface module 330 through the bridge module 415. In one embodiment, the processor module 405 executes software programs comprising a condition counter 110, a registration module 115, a threshold module 120, an increment module 125, a communication module 130, a management module 135, an input module 140, an initialization module 145, and one or more elements of a timer module 150.

Figure 5:
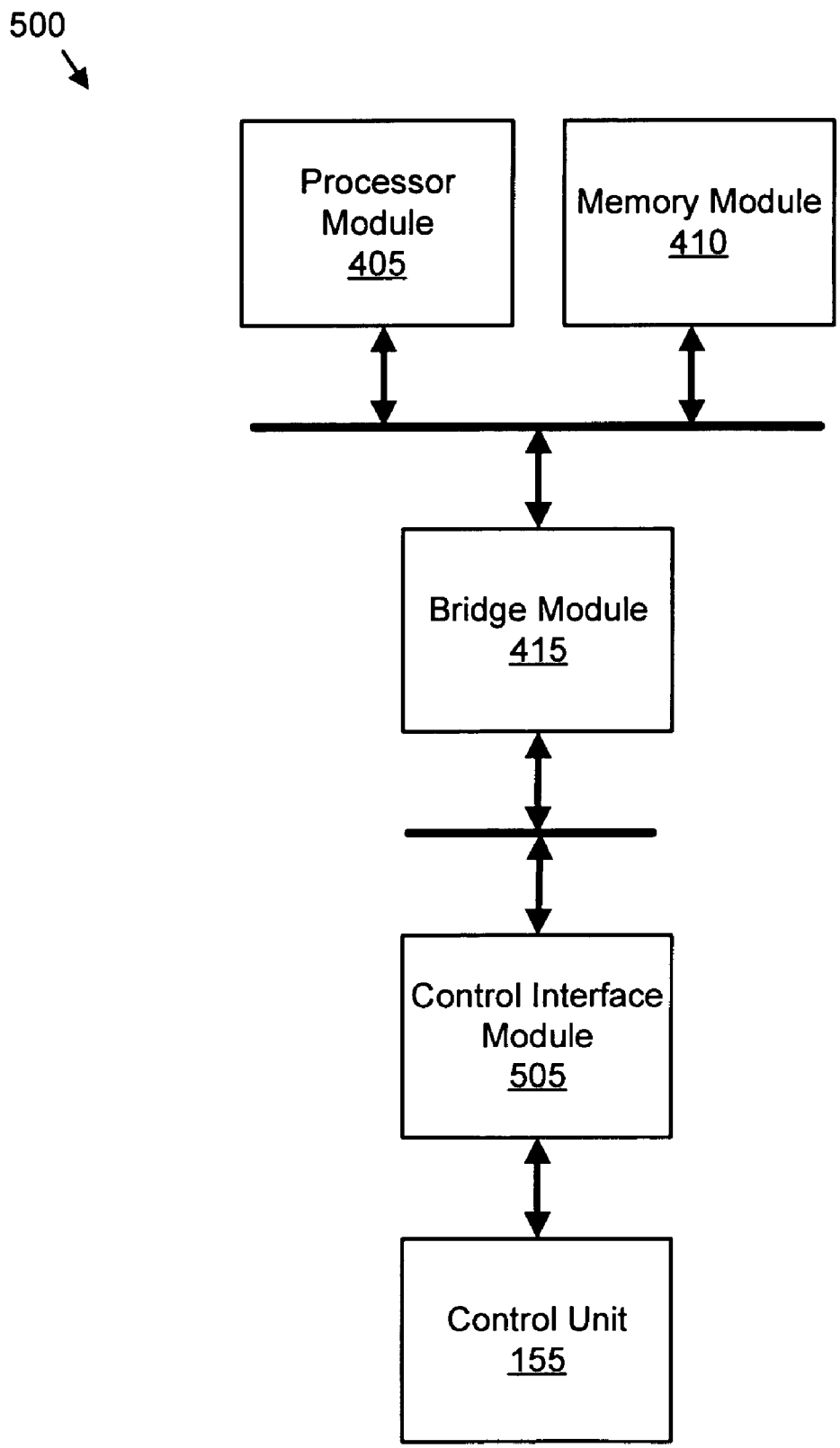
FIG. 5 is a schematic block diagram illustrating one embodiment of a component of the present invention.

FIG. 5 is a schematic block diagram illustrating one embodiment of a component 500 of the present invention. The processor module 405, memory module 410, bridge module 415, and control interface module 505 may be fabricated of semiconductor gates on one or more semiconductor substrates. Each semiconductor substrate may be packaged in one or more semiconductor devices mounted on circuit cards. Connections between the processor module 405, the memory module 410, the bridge module 415, and the control interface module 505 may be through semiconductor metal layers, substrate to substrate wiring, or circuit card traces or wires connecting the semiconductor devices.

In one embodiment, the processor module 405 executes software programs, as is well known to those skilled in the art, comprising an adjustment module 160 and a trace data module 165. The memory module 410 may further store the recorded trace data for the component 500. For example, the processor module 405 may receive a condition count from a communication module 130 of the control unit 155 through the control interface module 505 and the bridge module 415. In addition, the processor module 415 executing the adjustment module 160 may adjust the granularity of trace data recorded to the memory module 410 in response to the condition count.

The following schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
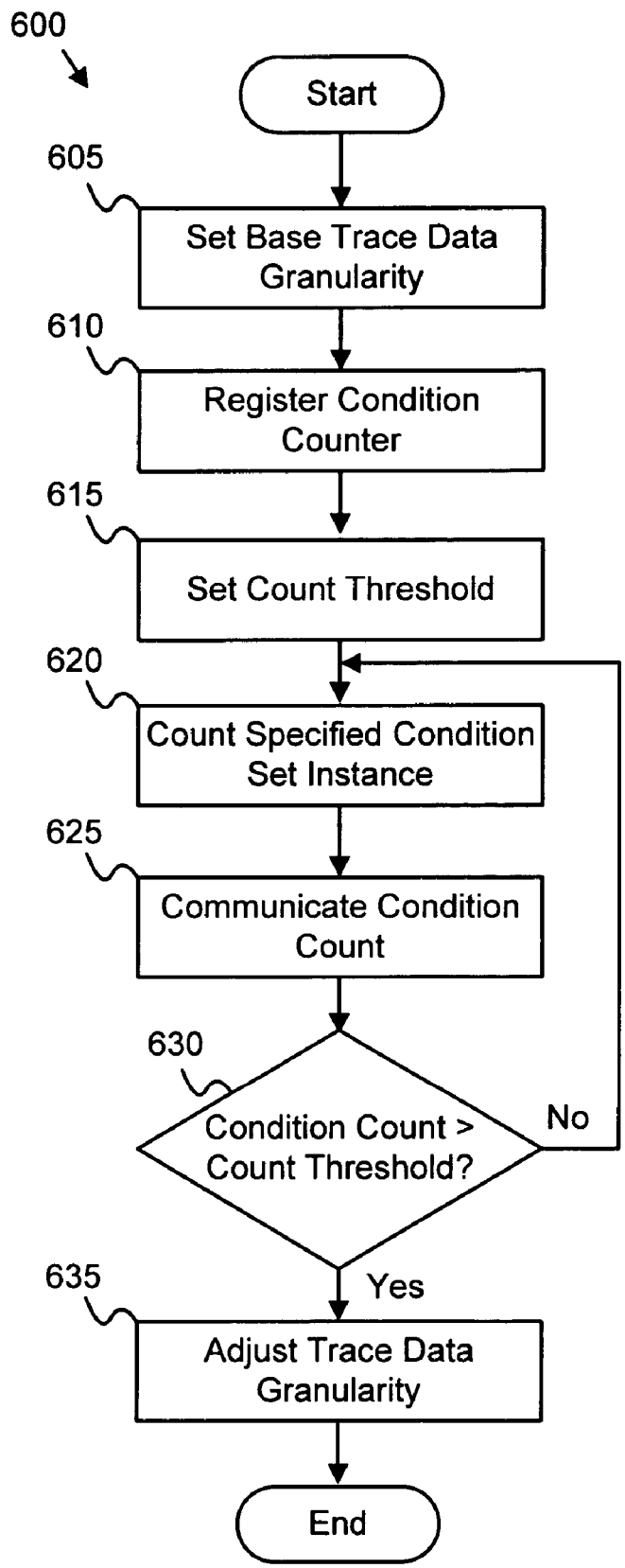
FIG. 6 is a schematic flow chart diagram illustrating one embodiment of a granularity adjustment method in accordance with the present invention.

FIG. 6 is a schematic flow chart diagram illustrating one embodiment of a granularity adjustment method 600 of the present invention. In one embodiment, an initialization module 145 sets 605 a base granularity for trace data recorded for a component 170. In one embodiment, the base granularity may be a relatively low granularity. In an alternate embodiment, the base granularity is a relatively high granularity. In a certain embodiment, the initialization module 145 sets 605 the base granularity using parameters from a configuration file. For example, the configuration file may specify each element recorded as trace data.

A registration module 115 registers 610 a condition counter 110. In one embodiment, the registration module 115 registers 610 the condition counter 110 by creating an array of linked arrays as is well known to those skilled in the art wherein each linked array comprises data fields configured to identify a system counter and an counter increment value, as well as a data field identifying the array as including system counter data. In addition, each system counter linked array may comprise a data field configured to store a next increment value, and a data field configured as an instance counter configured to store the number of instances of the system counter being incremented the number of instances specified by the counter increment value.

The one or more linked arrays of system counters and set increment values may comprise a condition set. At least one linked array may further comprise a data field configured as the condition counter 110. The registration module 115 may set the digital value of the condition counter to a specified value such as zero (0). In addition, at least one linked array may comprise a function call for an adjustment module 160 associated with the condition counter 110. In a certain embodiment, at least one linked array is configured to store a set increment value.

In one embodiment, one or more linked arrays of the array are granularity arrays configured to specify a trace data granularity parameter. For example, a first granularity parameter may specify one or more system events to record as trace data. In addition, a second granularity parameter may specify one or more values, such as processor module 405 register values and the like, to be recorded as trace data.

A threshold module 120 sets 615 a count threshold for the condition counter 110. In a certain embodiment, the threshold module 120 sets 615 the count threshold by writing the count threshold value to a linked array data field wherein the link array further comprised a data field identifying the linked array as containing the count threshold. In one embodiment, an administrator may adjust the count threshold through the input module 140. For example, the administrator may direct the threshold module 120 through an input module 140 to lower the count threshold for the condition counter 110 to potentially increase adjustments of trace data granularity.

An increment module 125 counts 620 each instance of the condition set. In one embodiment, the increment module 125 compares a linked array's next increment value with the count of the specified system counter. If the count of the system counter exceeds the next increment value, the increment module 125 may increment the instance counter for the linked array. In one embodiment, when each instance counter in each linked array exceeds the corresponding set increment value, the increment module 125 increments the condition counter 110.

In one embodiment, a communication module 130 communicates 625 the condition count of the condition counter 110 to the adjustment module 160. In one embodiment, the communication module 130 executes the adjustment module 160 function call and passes the condition count to the adjustment module 160. In addition, the communication module 130 may pass the count threshold to the adjustment module 160.

The adjustment module 160 determines 630 if the condition count exceeds the count threshold. If the condition count exceeds the count threshold, the adjustment module 160 adjusts 635 the granularity of trace data to the modified granularity. In one embodiment, the adjustment module 160 retrieves the modified granularity data parameters from the array of linked arrays. If the condition count does not exceed the count threshold, the increment module 125 continues to count 620 each instance of the condition set.

Figure 7:
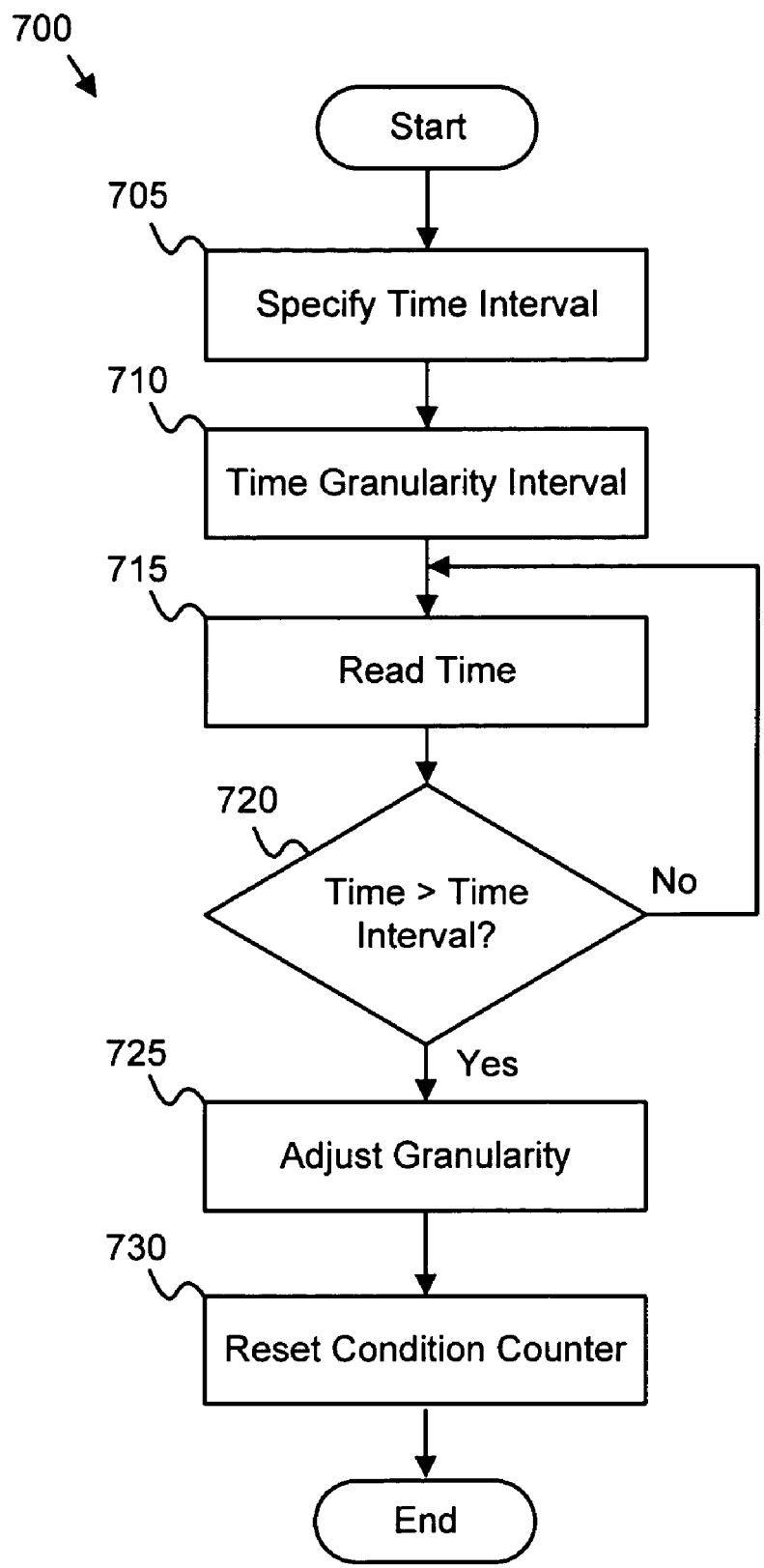
FIG. 7 is a schematic flow chart diagram illustrating one embodiment of a granularity resetting method of the present invention.

FIG. 7 is a schematic flow chart diagram illustrating one embodiment of a granularity resetting method 700 of the present invention. In one embodiment, an initialization module 145 specifies 705 a time interval. In a certain embodiment, the initialization module 145 specifies the time interval from a configuration file. In an alternate embodiment, an administrator directs the initialization module 145 to specify 705 the time interval through an input module 140.

A timer module 150 times 710 a granularity interval. In one embodiment, the granularity interval begins when the adjustment module 160 adjusts 635 the trace data granularity. In an alternate embodiment, the granularity interval begins when a base granularity of trace data is recorded. For example, the timer module 150 may begin timing the granularity interval when the initialization module 145 sets 605 the base trace data granularity.

The adjustment module 160 may read 715 the granularity interval time from the timer module 150 and determine 720 if the granularity interval time exceeds the specified time interval. If the granularity interval time exceeds the time interval, the adjustment module 160 may adjust 725 the granularity of the trace data to the base granularity. In one embodiment, the adjustment module 160 resets 730 the condition counter 110 to an original initial value. If the granularity interval time does not exceed the time interval, the adjustment module 160 continues to read 715 the granularity interval time. The method 700 may reset the trace data granularity to the base granularity subsequent to the time interval. Thus, the method 700 may in one embodiment only record high granularity trace data immediately subsequent to one or more system events defined by a condition set and a count threshold.

Figure 8:
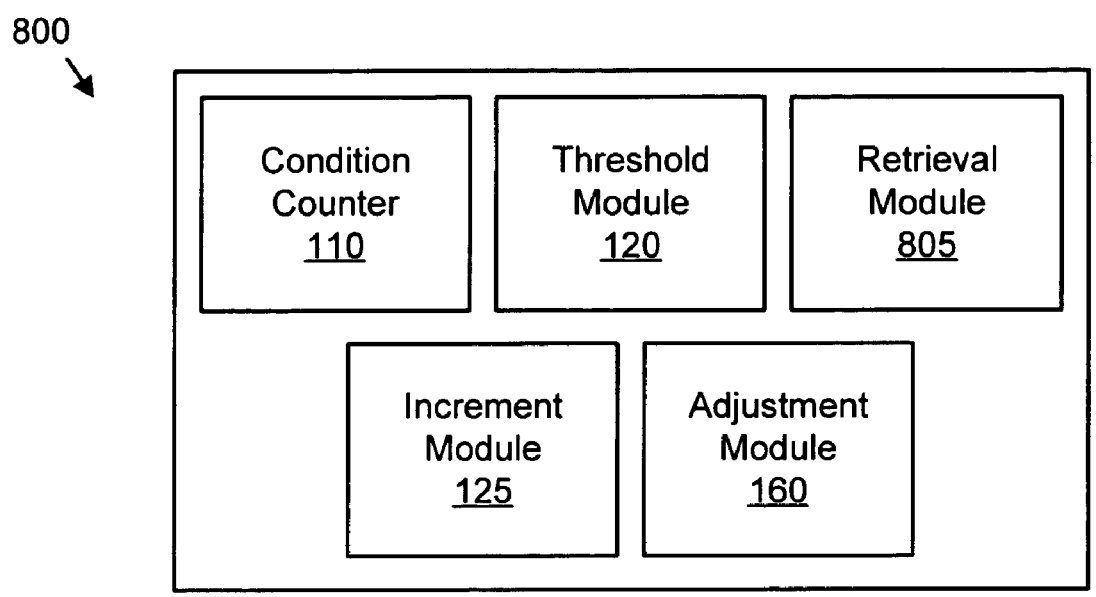
FIG. 8 is a schematic block diagram illustrating one embodiment of a component-based granularity adjustment apparatus of the present invention.

FIG. 8 is a schematic block diagram illustrating one embodiment of a component-based granularity adjustment apparatus 800 of the present invention. The apparatus 800 includes a condition counter 110, a threshold module 120, a retrieval module 805, an increment module 125, and an adjustment module 160.

The registration module 115 registers the condition counter 110 for a component 170 comprising the apparatus 800. The condition counter 110 comprises a condition set specifying one or more system counters and counts each occurrence of the condition set. The system counters may be located in an error module 105 in communication with apparatus 800. The threshold module 120 sets a count threshold for the condition counter 110. The retrieval module 805 retrieves the count of the system counters from the error module 105. The increment module 125 counts each instance of the condition set. The adjustment module 160 adjusts the granularity of trace data recorded for the component 170 to a modified granularity if the condition count exceeds the count threshold.

FIG. 9 is a schematic block diagram illustrating one embodiment of a condition counter array 900 of the present invention. The condition counter 110 of FIGS. 1 and 2 may comprise the condition counter array 900. In one embodiment, a registration module 115 creates the array 900. The array 900 comprises one or more linked arrays 950. Each linked array 950 includes one or more data fields 905, 910, 915, 920, 925, 930, 935, 940, 945. In one embodiment, each linked array 950 includes an identifier 905 identifying the function of the linked array's 950 data fields 905, 910, 915, 920, 925, 930, 935, 940, 945.

In the depicted embodiment, the first and second linked arrays 950a, 950b comprise a condition set. The first and second linked array 950a, 950b each comprise a system counter identifier 910, a counter increment value 915, a next increment value 920, and an instance counter 925.

The array 900 may also include linked arrays 950 comprising a condition count 945, a set increment value 930, and a function call 935. In one embodiment, a linked array 950 such as the sixth linked array 950f comprises one or more granularity parameters 940. The granularity parameters 940 may specify a modified granularity.

The present invention automatically and dynamically adjusts trace data granularity, allowing a system 100 or components 170 of a system 100 to record high granularity trace data under specified conditions while recording lower granularity trace data under other conditions. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to adjust trace data granularity, the apparatus comprising:
   a condition counter for a first component, the condition counter comprising a condition set and configured to count each occurrence of the condition set, wherein the condition set specifies at least one instance of at least one system counter that counts instances of a system event;
   a registration module configured to register the condition counter and the condition set;
   a threshold module configured to set multiple count thresholds for the condition counter;
   an increment module configured to count each instance of the condition set;
   an initialization module configured to initialize the granularity of trace data to a base granularity: and
   an adjustment module configured to adjust the granularity of the trace data recorded by the first component to multiple levels of increasingly detailed granularity if the condition count exceeds the established multiple count thresholds.

2. The apparatus of claim 1, further comprising a timer module configured to time the adjusted trace data granularity time interval, and wherein the adjustment module is further configured to set the granularity of the trace data to the base granularity when the adjusted trace data granularity time interval exceeds a specified time interval.

3. The apparatus of claim 2, wherein the timer module is further configured to time the unadjusted trace data granularity time interval, and wherein the adjustment module is further configured to adjust the granularity of trace data recorded by the first component to a modified granularity if the condition count does not exceed the count threshold within the specified time interval.

4. The apparatus of claim 1, further comprising a communication module configured to communicate the condition count to the first component.

5. The apparatus of claim 1, further comprising a management module configured to direct the adjustment module to adjust the granularity of the trace data to the modified granularity.

6. The apparatus of claim 5, further comprising an input module configured to receive an administrator command and the management module is further configured to direct the adjustment module to adjust the granularity of the trace data responsive to the administrator command.

7. The apparatus of claim 5, wherein the management module is further configured to direct the adjustment module to adjust the granularity of trace data of a second component if the condition count of the first component exceeds the count threshold.

8. An apparatus to adjust trace data granularity, the apparatus comprising:
   a condition counter comprising a condition set and configured to count each occurrence of the condition set, wherein the condition set specifies at least one instance of at least one system counter that counts instances of a system event;
   a threshold module configured to set multiple count thresholds for the condition counter;
   a retrieval module configured to retrieve the count of the at least one system counter from an error module;
   an increment module configured to calculate each instance of the condition set from the count of the at least one system counter;
   an initialization module configured to initialize the granularity of trace data to a base granularity; and
   an adjustment module configured to adjust the granularity of the trace data to multiple levels of increasingly detailed granularity if the condition count exceeds the established multiple count thresholds.

9. A system to adjust trace data granularity, the system comprising:
   a control unit comprising:
   an error module configured to maintain a plurality of system counters that count instances of a plurality of system events and comprising:
   a condition counter comprising a condition set and configured to count each occurrence of the condition set, wherein the condition set specifies at least one instance of at least one system counter;
   a registration module configured to register the condition counter and the condition set;
   a threshold module configured to set multiple count thresholds for the condition counter;
   an increment module configured to count each instance of the condition set;
   a communication module configured to communicate the condition count; and
   a first component in communication with the control unit, configured to receive the condition count, and comprising:
   a trace data module configured to record trace data;

an initialization module configured to initialize the granularity of trace data to a base granularity; and an adjustment module configured to adjust the granularity of the trace data recorded by the first component to multiple levels of increasingly detailed granularity if the condition count exceeds the established multiple count thresholds.

10. The system of claim 9, wherein the first component is configured as a host interface module, and further comprising a host system in communication with the control unit through the host interface module.

11. The system of claim 9, wherein the first component is configured as a storage interface module and further comprising a storage device in communication with the control unit through the storage interface module.

12. The system of claim 9, wherein the first component is configured as a cache interface module, and further comprising a cache module in communication with the control unit through the cache interface module.

13. The system of claim 9, further comprising a timer module configured to time the adjusted trace data granularity time interval, and wherein the adjustment module is further configured to set the granularity of the trace data to the base granularity when the adjusted trace data granularity time interval exceeds a specified time interval.

14. The system of claim 13, wherein the timer module is further configured to time the unadjusted trace data granularity time interval, and wherein the adjustment module is further configured to adjust the granularity of trace data recorded by the first component to a modified granularity if the condition count does not exceed the count threshold within the specified time interval.

15. The system of claim 9, further comprising a management module configured to direct the adjustment module to adjust the granularity of the trace data to the modified granularity.

16. The system of claim 15, further comprising an input module configured to receive an administrator command, and wherein the management module is further configured to direct the adjustment module to adjust the granularity of the trace data responsive to the administrator command.

17. The system of claim 15, wherein the management module is further configured to direct the adjustment module to adjust the granularity of trace data of a second component if the condition count of the first component exceeds the count threshold.

18. A program of executable code stored on a storage device and executed by a processor to perform operations to adjust trace data granularity, the operations comprising:

registering a condition counter comprising a condition set for a first component, the condition counter configured to count each occurrence of the condition set, wherein the condition set specifies at least one instance of at least one system counter that counts instances of a system event;

setting multiple count thresholds for the condition counter;

counting each instance of the condition set;

communicating the condition count to the first component;

initializing the granularity of trace data to a base granularity; and adjusting the granularity of the trace data recorded by the first component to multiple levels of increasingly detailed granularity if the condition count exceeds the established multiple count thresholds.

19. The program of claim 18, further comprising operations to adjust the granularity of the trace data responsive to an administrator command.

20. The program of claim 18, further comprising operations to adjust the granularity of trace data of a second component if the condition count of the first component exceeds the count threshold.

21. The program of claim 18, further comprising operations to time the adjusted trace data granularity time interval.

22. The program of claim 21, further comprising operations to set the granularity of the trace data to the base granularity when the adjusted trace data granularity time interval exceeds a specified time interval.

23. The program of claim 22, further comprising operations to time an unadjusted trace data granularity time interval and adjust the granularity of trace data recorded by the first component to a modified granularity if the condition count does not exceed the count threshold within the specified time interval.

24. An apparatus to adjust trace data granularity, the apparatus comprising:

means for registering a condition counter comprising a condition set for a first component, the condition counter configured to count each occurrence of the condition set, wherein the condition set specifies at least one instance of at least one system counter that counts instances of a system event;

means for setting multiple count thresholds for the condition counter;

means for counting each instance of the condition set;

means for communicating the condition count to the first component;

means for initializing the granularity of trace data to a base granularity; and means for adjusting the granularity of the trace data recorded by the first component to multiple levels of increasingly detailed granularity if the condition count exceeds the established multiple count thresholds.

* * * * *